United States Patent
Kim

(10) Patent No.: US 7,509,394 B2
(45) Date of Patent: Mar. 24, 2009

(54) METHOD FOR CONTROLLING FLOW OF RADIUS PROTOCOL

(75) Inventor: Bong-Cheol Kim, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 997 days.

(21) Appl. No.: 10/352,905

(22) Filed: Jan. 29, 2003

(65) Prior Publication Data

US 2003/0200277 A1 Oct. 23, 2003

(30) Foreign Application Priority Data

Apr. 22, 2002 (KR) ............................... 2002-22059

(51) Int. Cl.
*G06F 17/60* (2006.01)
(52) U.S. Cl. .............. 709/217; 709/245; 709/203; 709/200; 709/201; 709/202; 705/75; 713/156; 713/162; 713/168; 713/182; 713/201
(58) Field of Classification Search .......... 709/217, 709/231, 218, 224; 379/230, 221, 220
See application file for complete search history.

(56) References Cited

U.S. PATENT DOCUMENTS

| | | | |
|---|---|---|---|
| 6,119,160 A * | 9/2000 | Zhang et al. ............ | 709/224 |
| 6,151,628 A | 11/2000 | Xu et al. | |
| 6,400,722 B1 | 6/2002 | Chuah et al. | |
| 6,415,027 B1 | 7/2002 | Malik | |
| 6,442,165 B1 | 8/2002 | Sitaraman et al. | |
| 6,608,893 B1 * | 8/2003 | Fleming et al. ............ | 379/230 |
| 6,801,940 B1 * | 10/2004 | Moran et al. ............ | 709/224 |
| 7,020,084 B1 * | 3/2006 | Tanaka et al. ............ | 370/235 |
| 2003/0088679 A1 * | 5/2003 | Hori ...................... | 709/229 |

FOREIGN PATENT DOCUMENTS

WO    WO 00/10344    2/2000

* cited by examiner

*Primary Examiner*—Jude J Jean Gilles
(74) *Attorney, Agent, or Firm*—Robert E. Bushnell, Esq.

(57) ABSTRACT

A method for controlling a flow of a RADIUS (Remote Authentication Dial-In User Service) protocol, where the method allows a plurality of RADIUS servers to share a load in a RADIUS system in which a RADIUS client of the RADIUS system can swiftly receive a response message from a RADIUS server being responsive to a request message from the RADIUS client. The method includes the steps of allowing a RADIUS server to transmit a notification message to a RADIUS client on the basis of a packet format in the RADIUS protocol, the notification message having information relating to an available or unavailable state of the RADIUS server, and allowing the RADIUS client to check the available or unavailable state of the RADIUS server from the notification message received from the RADIUS server.

19 Claims, 8 Drawing Sheets

METHOD FOR CONTROLLING FLOW OF RADIUS PROTOCOL

CLAIM OF PRIORITY

This application makes reference to, incorporates the same herein, and claims all benefits accruing under 35 U.S.C. §119 from my application entitled *FLOW CONTROL METHOD OF RADIUS PROTOCOL* filed with the Korean Industrial Property Office on 22 Apr. 2002 and there duly assigned Ser. No. 2002-22059.

BACKGROUND OF THE INVENTION

1. Field of the Invention

The present invention relates to an AAA (Authentication, Authorization and Accounting) system, and more particularly to a RADIUS (Remote Authentication Dial-In User Service) protocol.

2. Description of the Related Art

A RADIUS (Remote Authentication Dial-In User Service) protocol is widely used as an industrial standard protocol of an AAA (Authentication, Authorization and Accounting) system performing mobile subscriber authentication for mobile Internet services, authorization verification and accounting information management for the sake of safe mobile Internet services. Such a RADIUS protocol was developed in the mid-1990s to provide NAS (Network Access Service) equipment, which is made by LIVINGSTON ENTERPRISES, Inc. owned by LUCENT TECHNOLOGIES, Inc., with authentication and accounting related services. As major characteristics, the RADIUS protocol uses a UDP (User Datagram Protocol) with a transport layer and conforms to a request/response scheme based on a client-server structure. Further, the authentication in the RADIUS protocol is accomplished using a prescribed shared secret key, which is not transferred over a network between a RADIUS client and a RADIUS server. Furthermore, the RADIUS protocol can use a variety of authentication protocols such as a PAP (Password Authentication Protocol) being an authentication protocol in a PPP (Point-to-Point Protocol), and a CHAP (Challenge Handshake Authentication Protocol) and the RADIUS protocol can be extended by the addition of new attributes.

A RADIUS system is based on a RADIUS protocol. For convenience, only one RADIUS client and one user are used in this RADIUS system example, but the RADIUS system includes a plurality of RADIUS clients and a plurality of users in practice. The RADIUS client as the NAS equipment connected to the user is connected to one of a plurality of RADIUS servers by the RADIUS protocol. The RADIUS servers are connected to a centralized DB (database) as a DB for the user According to the client-server structure based on the UDP of the RADIUS protocol in such a RADIUS system, if the RADIUS client requests an authentication and accounting process to one of the RADIUS servers, a corresponding RADIUS server sends a response to the request from the RADIUS client. At this time, a primary server, a secondary server and alternative servers among the RADIUS servers are designated to the RADIUS client. First, the RADIUS client transmits a request message having a packet format based on the RADIUS protocol to a RADIUS server designated as the primary server. Then, if the RADIUS client does not receive a response message from the RADIUS server, the RADIUS client re-transmits the request message a predetermined number of times until the RADIUS client receives the response message from the RADIUS server. Further, if the RADIUS client does not receive the response message from the primary server in spite of re-transmitting the request message the predetermined number of times, the RADIUS client transmits the request message to a RADIUS server designated as the secondary server in the same way as described above instead of the RADIUS server designated as the primary server. Furthermore, if the RADIUS client does not receive the response message from the secondary server in spite of re-transmitting the request message the predetermined number of times, the RADIUS client transmits the request message to one of RADIUS servers designated as the alternative servers in the same way as described above instead of the RADIUS server designated as the secondary server. Here, the alternative servers are sequentially selected, respectively.

In the client-server structure based on the UDP of the RADIUS protocol, the RADIUS server only performs a response function to the request of a RADIUS client. Conventionally, the RADIUS client and servers cannot know an operating state of the RADIUS server and an operating state of the RADIUS client, respectively. Now, there is not a mechanism in which either the RADIUS client or the RADIUS server can control a flow of the RADIUS protocol.

Accordingly, if a request message transmission in the RADIUS client is timed out, the RADIUS client cannot identify whether the time-out results from a network failure or a software error of the RADIUS server or whether the time-out results from insufficient process capability of the RADIUS server caused by the congestion of request messages. In this case, the RADIUS client re-transmits the request message the predetermined number of times to the RADIUS server regardless of a cause of the time-out. Because the RADIUS client tries to re-transmit the request message to other RADIUS servers until the RADIUS client receives the response message, the RADIUS client needs a lot of time to receive the request message from an available RADIUS server. Further, because the RADIUS client may re-transmit the request message to a particular RADIUS server whose process capability is insufficient, the re-transmission of the request message burdens the particular RADIUS server with a heavy load.

SUMMARY OF THE INVENTION

Therefore, the present invention has been made in view of the above and other problems, and it is an object of the present invention to provide a method for controlling a flow of a RADIUS (Remote Authentication Dial-In User Service) protocol, the method being capable of allowing a plurality of RADIUS servers to share a load in a RADIUS system.

It is another object of the present invention to provide a method for controlling a flow of a RADIUS (Remote Authentication Dial-In User Service) protocol in a RADIUS system in which a RADIUS client can swiftly receive a response message from a RADIUS server being responsive to a request message from the RADIUS client.

In accordance with one aspect of the present invention, the above and other objects can be accomplished by the provision of a method for controlling a flow of a RADIUS (Remote Authentication Dial-In User Service) protocol in a RADIUS system based on a client-server structure, including the steps of: allowing a RADIUS server to transmit a notification message to a RADIUS client on the basis of a packet format in the RADIUS protocol, the notification message having information relating to an available or unavailable state of the RADIUS server; and allowing the RADIUS client to check the available or unavailable state of the RADIUS server from the notification message received from the RADIUS server.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
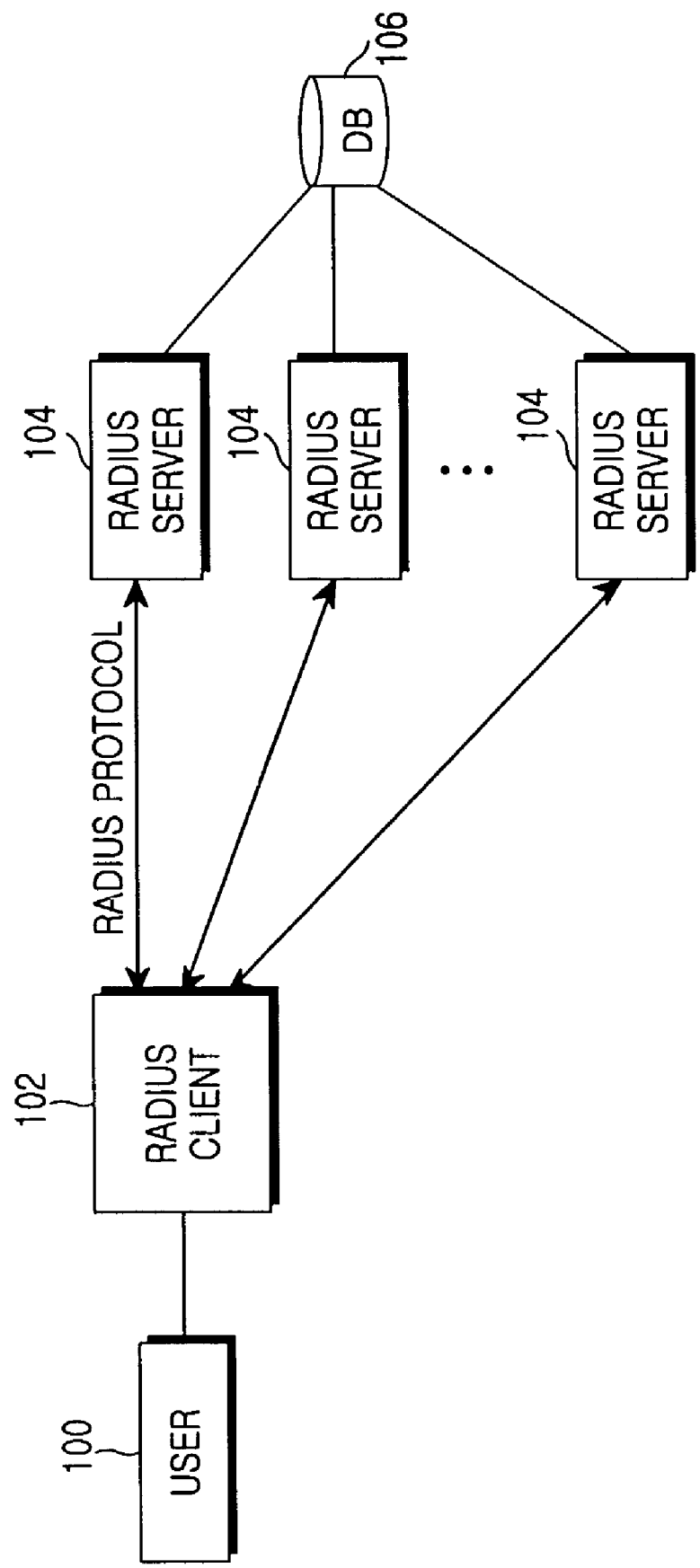
FIG. 1 is a view showing a RADIUS (Remote Authentication Dial-In User Service) system based on a RADIUS protocol.

Turning now to the drawings, FIG. 1 is a view showing a RADIUS system based on a a RADIUS protocol. For convenience, only one RADIUS client 102 and one user 100 are shown in the RADIUS system in FIG. 1, but the RADIUS system includes a plurality of RADIUS clients 102 and a plurality of users 100 in practice. The RADIUS client 102 as the NAS equipment connected to the user 100 is connected to one of a plurality of RADIUS servers 104 by the RADIUS protocol. The RADIUS servers 104 are connected to a centralized DB (database) 106 as a DB for the user 100. According to the client-server structure based on the UDP of the RADIUS protocol in such a RADIUS system, if the RADIUS client 102 requests an authentication and accounting process to one of the RADIUS servers 104, a corresponding RADIUS server 104 sends a response to the request from the RADIUS client 102. At this time, a primary server, a secondary server and alternative servers among the RADIUS servers 104 are designated to the RADIUS client 102. First, the RADIUS client 102 transmits a request message having a packet format based on the RADIUS protocol to a RADIUS server 104 designated as the primary server. Then, if the RADIUS client 102 does not receive a response message from the RADIUS server 104, the RADIUS client 102 re-transmits the request message a predetermined number of times until the RADIUS client 102 receives the response message from the RADIUS server 104. Further, if the RADIUS client 102 does not receive the response message from the primary server in spite of re-transmitting the request message the predetermined number of times, the RADIUS client 102 transmits the request message to a RADIUS server 104 designated as the secondary server in the same way as described above instead of the RADIUS server 104 designated as the primary server. Furthermore, if the RADIUS client 102 does not receive the response message from the secondary server in spite of re-transmitting the request message the predetermined number of times, the RADIUS client 102 transmits the request message to one of RADIUS servers 104 designated as the alternative servers in the same way as described above instead of the RADIUS server 104 designated as the secondary server. Here, the alternative servers are sequentially selected, respectively.

Now, preferred embodiments of the present invention will be described in detail with reference to the annexed drawings.

In the following description, a detailed description of known functions and configurations incorporated herein will be omitted when it may make the subject matter of the present invention rather unclear.

Figure 2:
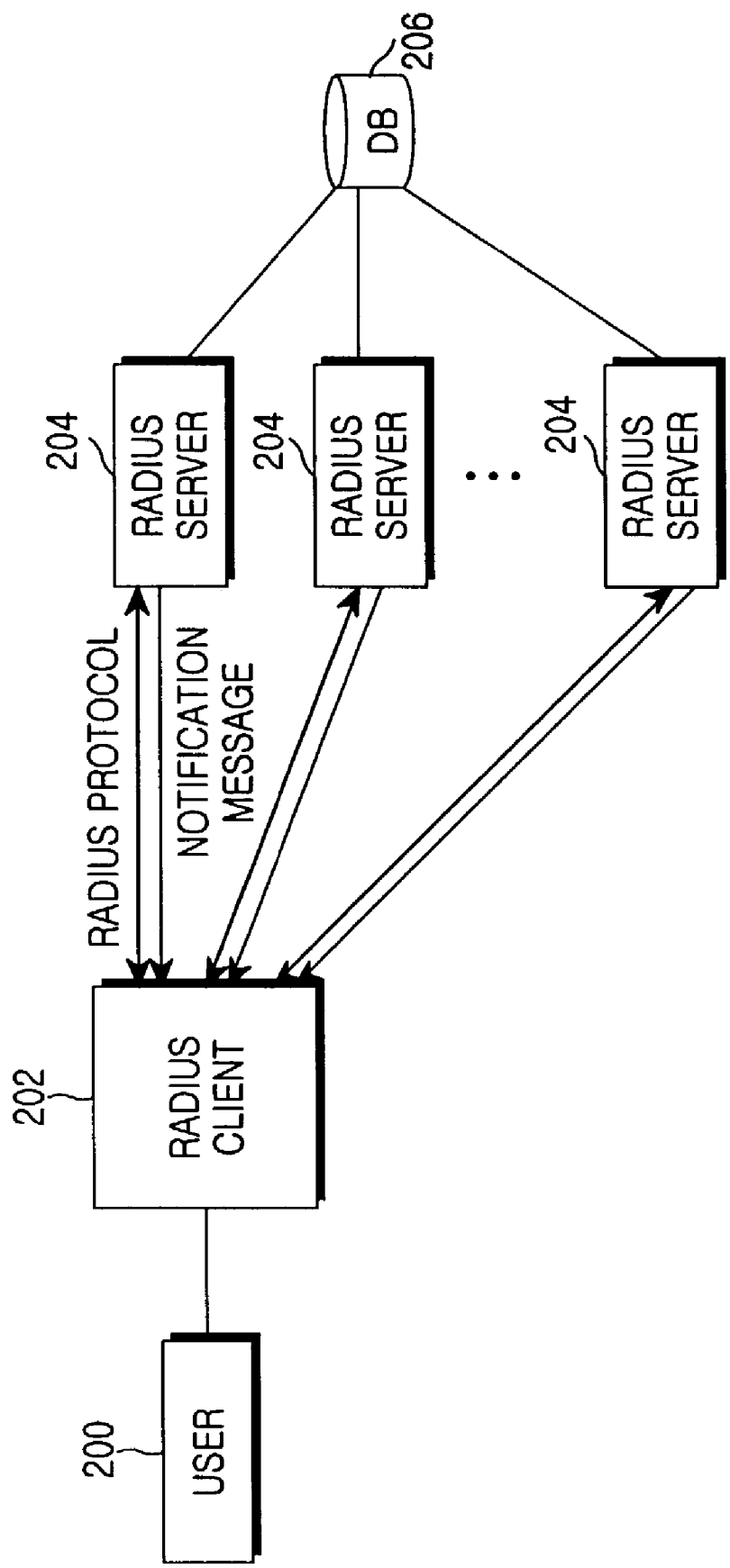
FIG. 2 is a view showing a RADIUS system to which a function for transmitting and receiving a notification message is added in accordance with the present invention.

FIG. 2 is a view showing a RADIUS (Remote Authentication Dial-In User Service) system in accordance with the present invention. As shown in FIG. 2, each of the RADIUS servers 204 in the RADIUS system is similar to the RADIUS system shown in FIG. 1. However, each of RADIUS servers 204 transmits a notification message indicating its own state to a RADIUS client 202 in a packet format based on a RADIUS protocol. In other words, the RADIUS system shown in FIG. 2 is different from that shown in FIG. 1 in that a RADIUS server 204 in FIG. 2 transmits the notification message to the RADIUS client 202 and the RADIUS client 202 in FIG. 2 receives the notification message from the RADIUS server 204, in addition to the RADIUS protocol of the RADIUS system shown in FIG. 1. This scheme is a mixture scheme of a client-server scheme based on the RADIUS protocol and a peer-to-peer scheme, and a type of a trap message based on a SNMP (Simple Network Management Protocol) is applied in the mixture scheme. The scheme allows the RADIUS client 202 to control a flow of the RADIUS protocol using server state information contained in the notification message provided from the RADIUS server 204.

Figure 3A:
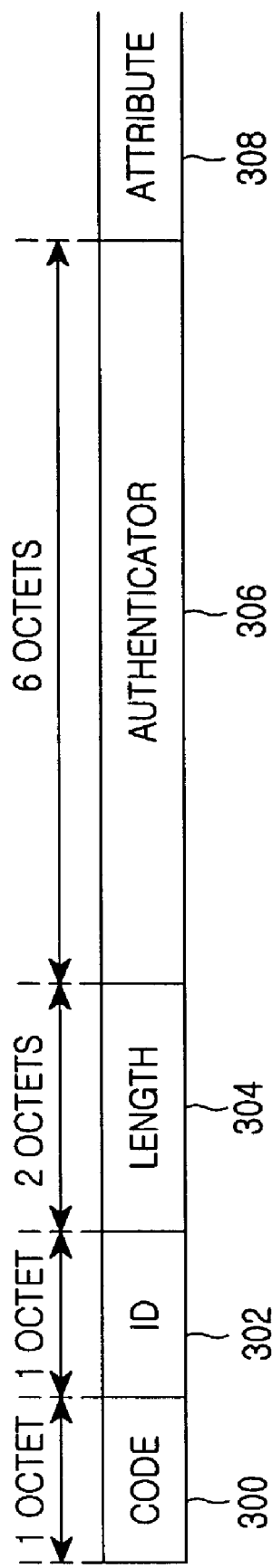
FIG. 3A is a view showing a data format of a RADIUS packet based on RFC 2865.
Figure 3B:
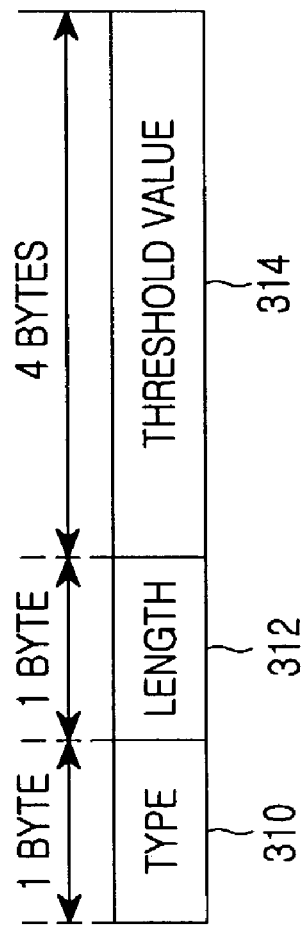
FIG. 3B is a view showing an attribute field format of the notification message in accordance with the present invention.

The notification message based on the RADIUS protocol has the same format as the request message or the response message, and the notification message indicates a state of the RADIUS server 204. A data format of a RADIUS packet based on RFC 2865 in RFC (Request for Comments) of Internet-related documents will be described in connection with FIG. 3A. As shown in FIG. 3A, the data format of the RADIUS packet is made up of a code field 300, an identifier (ID) field 302, a length field 304, an authenticator field 306 and an attribute field 308. A code in the code field 300 denotes a type of a packet. The notification message in accordance with the present invention includes a part being unused in the RFC 2865 and the part being unused in the RFC 2865 includes a code denoting a type of a message. The RADIUS server 204 and the RADIUS client 202 can identify the notification message using the code denoting the type of the message. Further, the RADIUS server 204 transmits the notification message including an attribute field 308 having a type field 310, a length field 312 and a threshold value field 314 shown in FIG. 3B to the RADIUS client 202, the attribute field 308 having information of the notification message. The type field 310 has a unique value indicating a type of an attribute of information contained in the attribute field 308. The length field 312 indicates a total length of the information contained in the attribute field 308 and the total length of the notification message is six bytes as shown in FIG. 3B. The threshold value field 314 includes a current state of the RADIUS server 204 and a level of a predetermined threshold value.

The current state of the RADIUS server 204 is divided into an available state and an unavailable state. The unavailable state means a busy state indicating a case where the number of request messages being queued in a receiving buffer contained in the RADIUS server 204 has exceeded a maximum threshold value. Here, the number of request messages represents a queued message count value. Further, the available state indicates a case where the number of request messages being queued in the receiving buffer contained in the RADIUS server 204 is less than the maximum threshold value. The maximum threshold value is set to the maximum number of request messages, which can be processed by the RADIUS server 204 within a period of request message re-transmission of the RADIUS client 202 or before the request message transmission of the RADIUS client 202 is timed out.

Further, a threshold value is set on the basis of the number of request messages being queued in the receiving buffer within the RADIUS server 204 as shown in Table 1.

TABLE 1

| Level of threshold value | Number of request messages being queued |
|---|---|
| 5 | Over maximum threshold value |
| 4 | Maximum threshold value × value over 0.8~Maximum threshold value |
| 3 | Maximum threshold value × value over 0.6~Maximum threshold value × value below 0.8 |
| 2 | Maximum threshold value × value over 0.4~Maximum threshold value × value below 0.6 |
| 1 | Maximum threshold value × value over 0.2~Maximum threshold value × value below 0.4 |
| 0 | Below minimum threshold value |

The RADIUS server 204 sets the maximum number of request messages, which can be processed by the RADIUS server 204 before the request message transmission in the RADIUS client 202 is timed out. For example, when it is assumed that the maximum threshold value is set to "1000", the minimum threshold value is set to "200".

Figure 4:
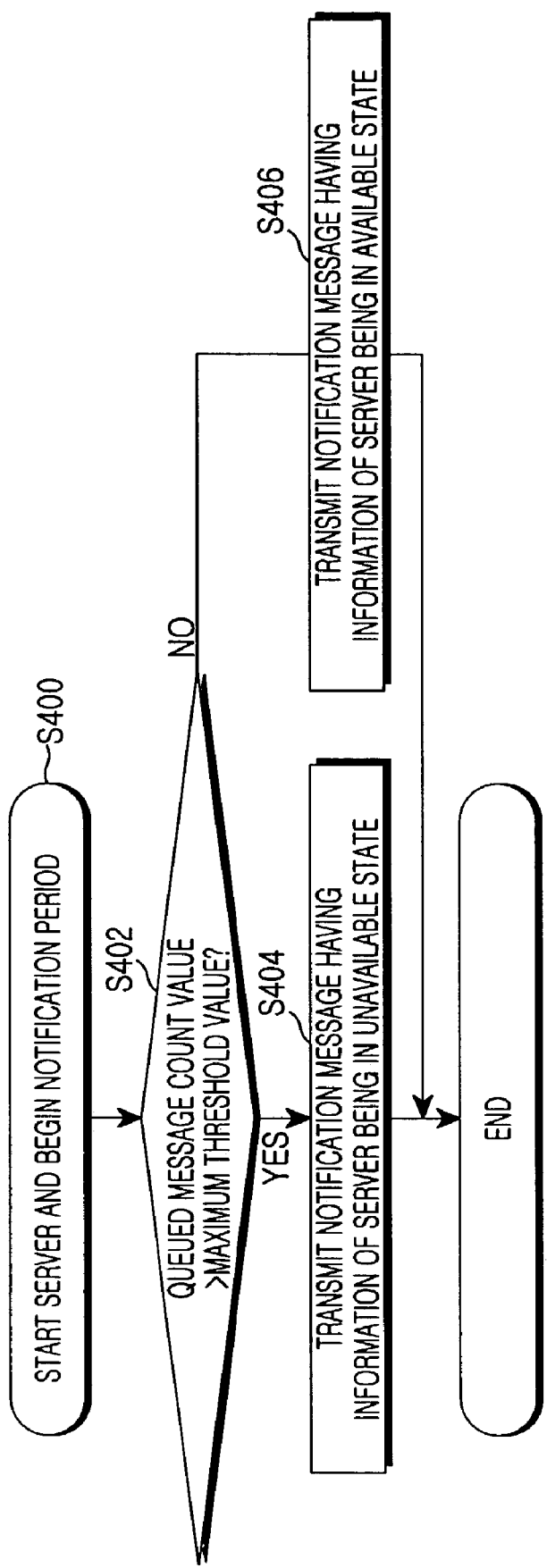
FIGS. 4 through 6 are flow charts describing a procedure of transmitting the notification message in a RADIUS server 204 of FIG. 2 in accordance with the present invention.
Figure 5:
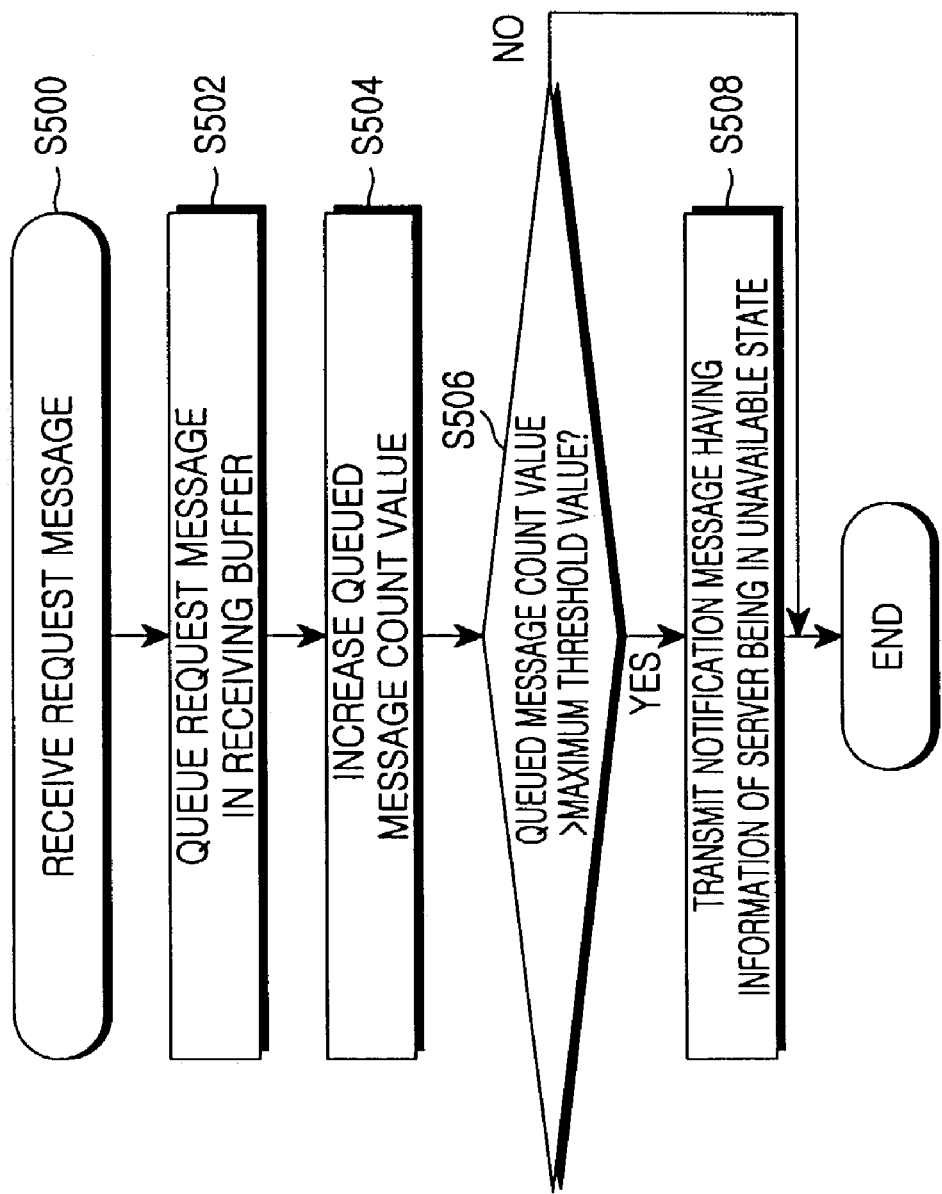
Figure 6:
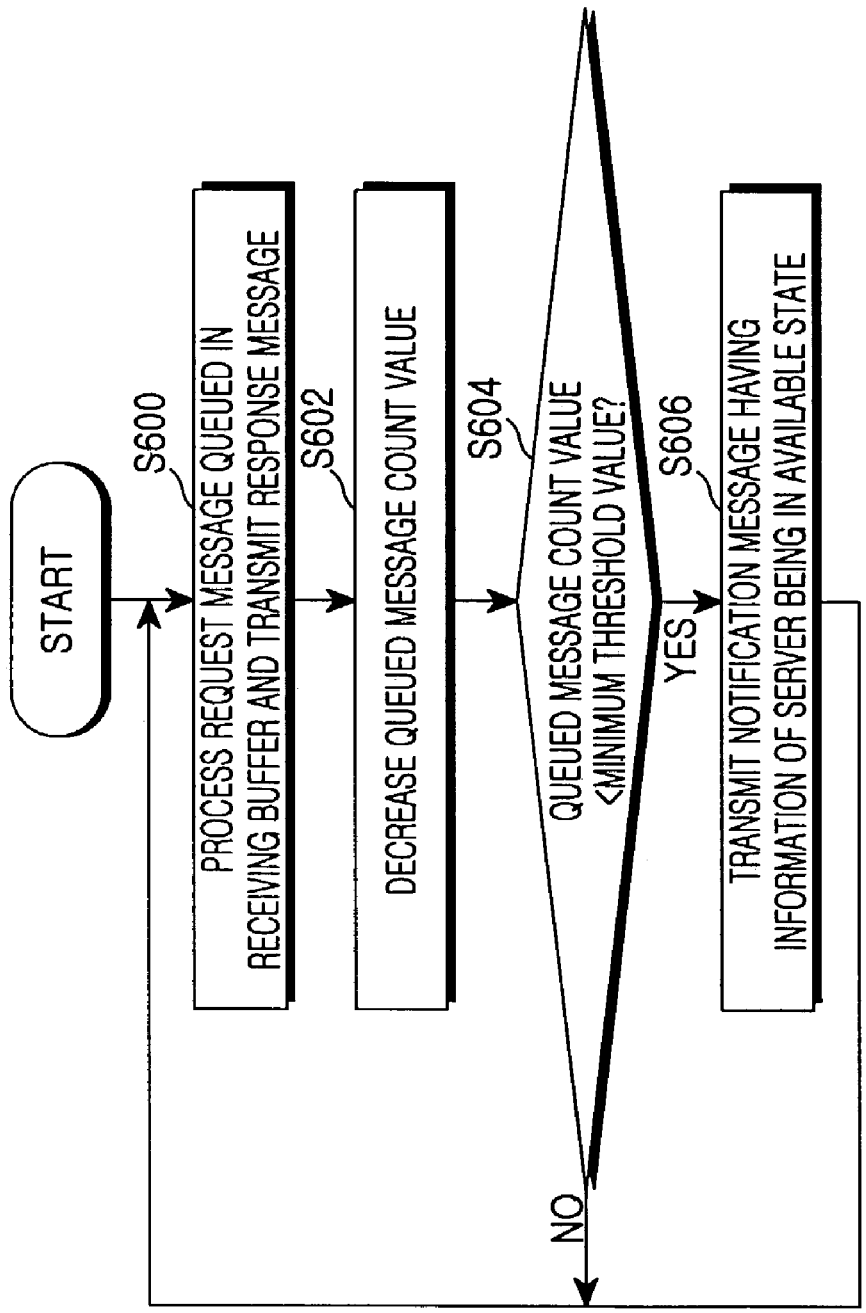
Figure 7:
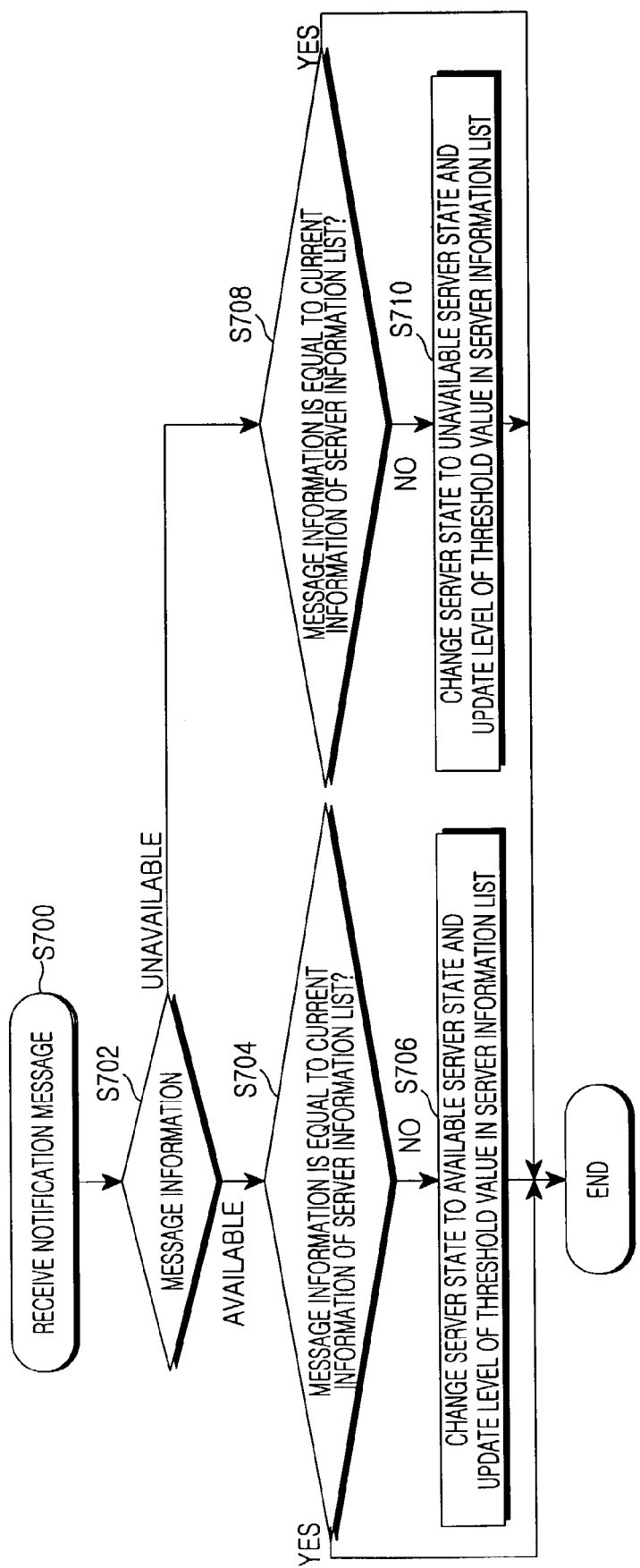
FIG. 7 is a flow chart describing a procedure of processing the notification message in a RADIUS client 202 of FIG. 2 in accordance with the present invention.

FIGS. 4 through 6 are flow charts describing a procedure of transmitting the notification message in the RADIUS server 204 of FIG. 2 in accordance with the present invention.

As shown in FIG. 4, the RADIUS server 204 starts or a predetermined period of notification in the RADIUS server 204 begins at step S400. Then, the RADIUS server 204 determines at step S402 whether the number of request messages being queued in the receiving buffer contained in the RADIUS server 204 has exceeded the maximum threshold value. If the number of request messages being queued in the receiving buffer contained in the RADIUS server 204 has exceeded the maximum threshold value, the RADIUS server 204 transmits the notification message containing information of the unavailable state as the busy state and the level of the threshold value to the RADIUS client 202 at step S404.

On the other hand, if the number of request messages being queued in the receiving buffer contained in the RADIUS server 204 has not exceeded the maximum threshold value, the RADIUS server 204 transmits the notification message containing information of the available state and the level of the threshold value to the RADIUS client 202 at step S406.

For example, the predetermined period of notification is set to five minutes. Further, the RADIUS server 204 periodically transmits the notification message to the RADIUS client 202 and the notification message further acts as a hello packet.

If the RADIUS server 204 receives the request message from the RADIUS client 202 at step S500 shown in FIG. 5, the RADIUS server 204 stores the request message in the receiving buffer at step S502. Then, the RADIUS server 204 increases the queued message count value at step S504. Then, the RADIUS server 204 determines at step S506 whether the queued message count value has exceeded the maximum threshold value. If the queued message count value has exceeded the maximum threshold value, the RADIUS server 204 transmits the notification message containing information of the unavailable state as the busy state and the level of the threshold value to the RADIUS client 202 at step S508. Otherwise, the notification message transmission in the RADIUS server 204 is immediately completed.

Further, where the RADIUS server 204 processes the request message queued in the receiving buffer, the RADIUS server 204 transmits a response message to the RADIUS client 202 after processing the request message queued in the receiving buffer at step S600 shown in FIG. 6. Then, after the RADIUS server 204 decreases the queued message count value at step S602, the RADIUS server 204 determines at step S604 whether the queued message count value is less than the minimum threshold value. If the queued message count value is less than the minimum threshold value, the RADIUS server 204 transmits the notification message containing information of the available state and the level of the threshold value to the RADIUS client 202 at step S606. Otherwise, the RADIUS server 204 proceeds to the above step S600.

On the other hand, the RADIUS client 202 updates the information relating to the RADIUS servers 204 in a server information list in response to available and unavailable states and levels of threshold values from notification messages transmitted by the RADIUS servers 204. The server information list includes the information of the available or unavailable state and the level of the threshold value with respect to each of the RADIUS servers 204. If the RADIUS client 202 receives the notification message from the RADIUS server 204 at step S700, the RADIUS client 202 checks the available or unavailable state and the level of the threshold value from the notification message at step S702. If the state of the RADIUS server 204 is the available state, the RADIUS client 202 proceeds to step S704. On the other hand, if the state of the RADIUS server 204 is the unavailable state, the RADIUS client 202 proceeds to step S708. The RADIUS client 202 determines at the above step S704 whether the available state and the level of the threshold value from the notification message are the same as those currently contained in the server information list. If the available state and the level of the threshold value from the notification message are the same as those currently contained in the server information list, the RADIUS client 202 does not update the server information list. Otherwise, the RADIUS client 202 updates the state of the RADIUS server 204 to the available state and updates the level of the threshold value in the server information list at step S706. Thereafter, the RADIUS client 202 can transmit the request message to the RADIUS server 204 so that the RADIUS client 202 can receive the response message from the RADIUS server 204.

On the other hand, if the state of the RADIUS server 204 is determined to be the unavailable state in step S702, the RADIUS client 202 determines at the above step S708 whether the unavailable state and the level of the threshold value from the notification message are the same as those currently contained in the server information list. If the unavailable state and the level of the threshold value from the notification message are the same as those currently contained in the server information list, the RADIUS client 202 does not update the server information list. Otherwise, the RADIUS client 202 updates the state of the RADIUS server 204 to the unavailable state and updates the level of the threshold value in the server information list at step S710. Thereafter, the RADIUS client 202 does not transmit the request message to the RADIUS server 204 being in the unavailable state. As a result, the RADIUS client 202 can reduce the number of re-transmission times the request message is directed to a particular RADIUS server 204, and reduce the number of the time-outs of the request message transmission by transmitting the request message to one of other RADIUS servers 204, i.e., one of the secondary and alternative servers. The RADIUS servers 204 can share a load of the request message processing.

Figure 8:
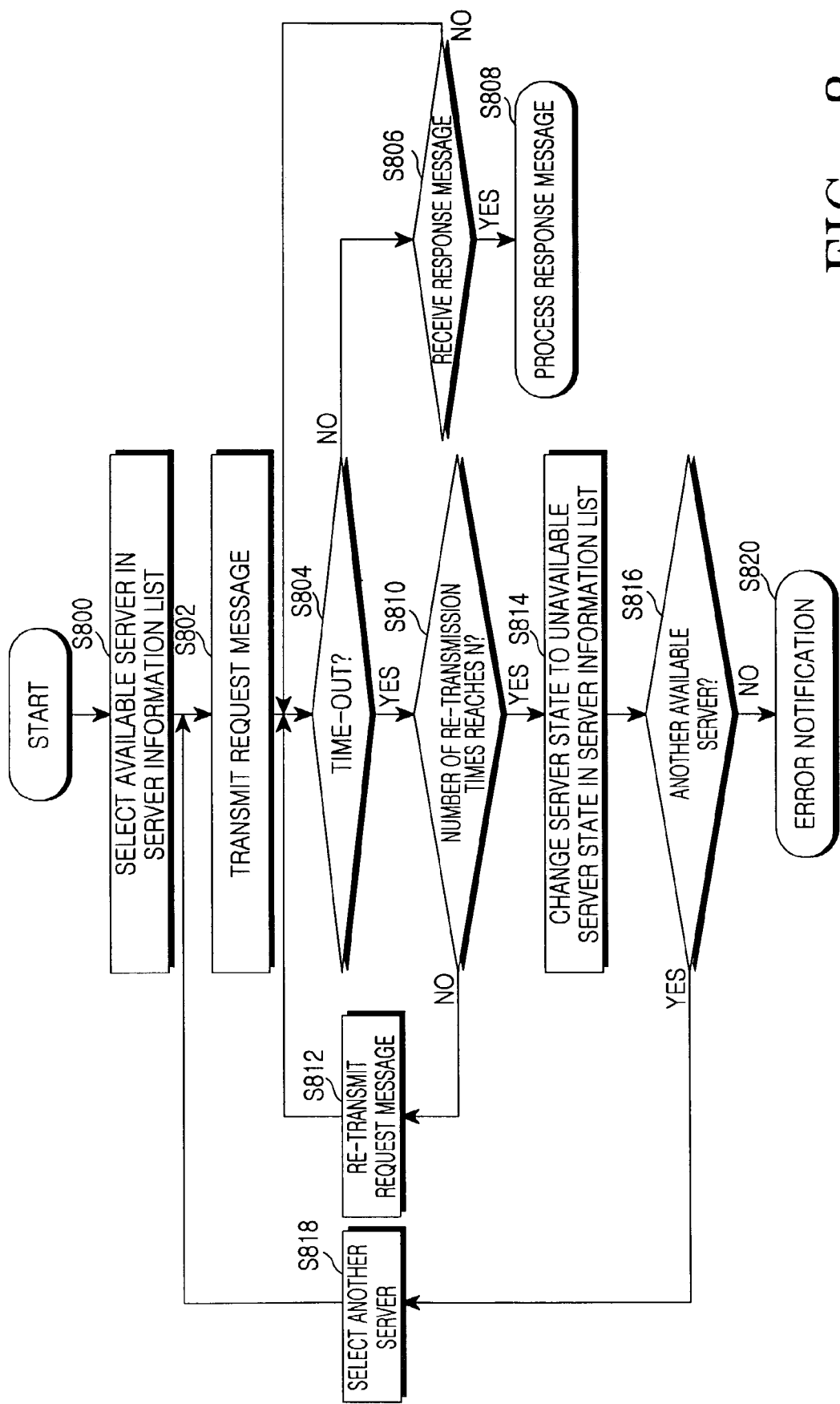
FIG. 8 is a flow chart describing a procedure of processing a request message from the RADIUS client 202 of FIG. 2 in accordance with the present invention.

In a state as described above, the RADIUS client 202 transmits the request message to the RADIUS server 204 on the basis of the RADIUS protocol in response to a user's connection as shown in FIG. 8. The RADIUS client 202 selects an available RADIUS server using the server information list at step S800 and the RADIUS client 202 transmits the request message to the available RADIUS server at step S802. After transmitting the request message, if the RADIUS client 202 does not receive the response message from the available RADIUS server until the request message transmission is timed out at steps S804 to S806, the RADIUS client 202 re-transmits the request message until the predetermined number of times reaches N where the N is a positive integer at steps S810 to S812. Further, if the RADIUS client 202 receives the response message from the available RADIUS server before the request message transmission is timed out, the RADIUS client 202 processes the response message at step S808. On the other hand, if the request message transmission is timed out after the RADIUS client 202 re-transmits the request message the predetermined number of times, the RADIUS client 202 regards the state of the RADIUS server 204 as the unavailable state due to a failure of the RADIUS server 204 or a network and then the RADIUS client 202 changes the state of the RADIUS server 204 to the unavailable state in the server information list at step S814. Then, the RADIUS client 202 determines at step S816 whether there is another RADIUS server 204 in the available state. If there is another RADIUS server 204 in the available state, the RADIUS client 202 selects another RADIUS server 204 in the available state at step S818 and proceeds to the above step S802. Otherwise, the RADIUS client 202 notifies a user of an error at step S820.

There are various ways for selecting the RADIUS servers 204 being in the available state. For example, the RADIUS client 202 can give priorities to the RADIUS servers 204 to be listed in the server information list and the RADIUS client 202 first selects the RADIUS server 204 having a top priority in order of a primary server, a secondary server, etc. Further, the RADIUS client 202 can select the RADIUS servers 204 being in the available state according to a round robin scheme. Furthermore, the RADIUS client 202 can first select a RADIUS server 204 to be first retrieved in the server information list. Preferably, the RADIUS client 202 can select the RADIUS servers on the basis of the levels of the threshold values from the notification messages transmitted by the RADIUS servers 204. In other words, the RADIUS client 202 can first select a RADIUS server 204 having a lowest level, i.e., a smallest server load, among the RADIUS servers 204 in the available state.

As apparent from the above description, a RADIUS client can identify a failure of a RADIUS server or network from the notification message. After the RADIUS server is put in an unavailable state because of a temporary failure of the RADIUS server or network, the RADIUS client can identify a recovery of the RADIUS server or network and perform normal services if the RADIUS client identifies an available or busy state of the RADIUS server from the notification message. Further, the RADIUS client no longer burdens the RADIUS server, being in the unavailable state, with a load and the RADIUS client uses other RADIUS servers to perform the normal services. The RADIUS server being in the unavailable state because of the temporary failure of the RADIUS server or network is excluded from the services until the RADIUS server is put in the available state. The RADIUS client does not need to do unnecessary message transmission and the RADIUS client can swiftly receive a response message. Further, the RADIUS client allows a plurality of RADIUS servers to share the load.

Although the preferred embodiments of the present invention have been disclosed for illustrative purposes, those skilled in the art will appreciate that various modifications, additions and substitutions are possible, without departing from the scope of the invention. Particularly, although a RADIUS server notifies a RADIUS client of its own unavailable state through a notification message only where the RADIUS server is put in a busy state in an embodiment of the present invention, the RADIUS server can further notify the RADIUS client of its own unavailable state through the notification message when the RADIUS server identifies through an itself diagnosis that an error is generated in the RADIUS server. Accordingly, the present invention is not limited to the above-described embodiments, but the present invention is defined by the claims which follow, along with their full scope of equivalents.

What is claimed is:

1. A method, comprising:
providing a remote authentication dial-in user service (RADIUS) system that includes a RADIUS client and a plurality of RADIUS servers that communicate with the RADIUS client via RADIUS protocol;
allowing one of the plurality of RADIUS servers to transmit a notification message to the RADIUS client on the basis of a packet format in the RADIUS protocol, the notification message including information relating to an available or unavailable state of the one of the plurality of RADIUS servers; and
allowing the RADIUS client to update a state of the one of the plurality of RADIUS servers in a server information list according to the available or unavailable state of the one of the plurality of RADIUS servers contained in the notification message, the server information list comprising information of the available or unavailable state of each of the plurality of RADIUS servers, the notification message being separate and distinguished from a response to a request message by the RADIUS client requesting authentication, authorization and accounting services.

2. The method of claim 1, further comprising:
allowing the one of the plurality of RADIUS servers to transmit the notification message to the RADIUS client on the basis of the packet format in the RADIUS protocol after the one of the plurality of RADIUS servers checks its own state when the one of the plurality of RADIUS servers starts, the notification message including information relating to the available or unavailable state of the one of the plurality of RADIUS servers.

3. The method of claim 1, further comprising:
allowing one of the plurality of RADIUS servers to transmit the notification message to the RADIUS client on the basis of the packet format in the RADIUS protocol after the one of the plurality of RADIUS servers periodically checks its own state, the notification message including information relating to the available or unavailable state of the one of the plurality of RADIUS servers.

4. A method, comprising:
providing a remote authentication dial-in user service (RADIUS) system that includes a RADIUS client and a plurality of RADIUS servers that communicate with the RADIUS client via RADIUS protocol;
allowing one of the plurality of RADIUS servers to transmit a notification message to the RADIUS client on the basis of a packet format in the RADIUS protocol, the notification message including information relating to an available or unavailable state of the one of the plurality of RADIUS servers; and
allowing the RADIUS client to update a state of the one of the plurality of RADIUS servers in a server information list according to the available or unavailable state of the one of the plurality of RADIUS servers contained in the notification message, the server information list comprising information of the available or unavailable state of each of the plurality of RADIUS servers, the available or unavailable state of each of the plurality of RADIUS servers being based upon whether a queued message count for a corresponding one of the plurality of RADIUS servers exceeds a maximum threshold value, the queued message count indicating a number of request messages queued to the corresponding one of the plurality of RADIUS servers.

5. The method of claim 1, further comprising:
the server information list further comprising level of threshold value information of each of the plurality of RADIUS servers.

6. The method of claim 1, further comprising:
selecting, by said RADIUS client, one of said plurality of RADIUS servers in said server information list based on information stored in said server information list; and
transmitting, by said RADIUS client, a request message to said selected one of said plurality of RADIUS servers requesting authentication, authorization and accounting services.

7. The method of claim 4, further comprising:
selecting, by said RADIUS client, one of said plurality of RADIUS servers in said server information list based on information stored in said server information list; and
transmitting, by said RADIUS client, a request message to said selected one of said plurality of RADIUS servers requesting authentication, authorization and accounting services.

8. The method of claim 7, further comprising:
allowing the RADIUS client to re-transmit the request message the predetermined number of times until the request message transmission is timed out after the RADIUS client transmits the request message;
allowing the RADIUS client to process a response message when the RADIUS client receives the response message from the server before the request message transmission is timed out; and
allowing the RADIUS client to select another available RADIUS server in the server information list and transmit the request message to the another available RADIUS server on the basis of the RADIUS protocol when the request message transmission is timed out after the RADIUS client re-transmits the request message the predetermined number of times.

9. The method of claim 8, further comprising:
the RADIUS client selecting the one of the plurality of RADIUS servers based on both availability information and level of threshold value information of each of the plurality of RADIUS servers stored in the server information list.

10. A method, comprising:
providing a remote authentication dial-in user service (RADIUS) system that includes a RADIUS client and a plurality of RADIUS servers that communicate with the RADIUS client via RADIUS protocol;
queuing a request message in a receiving buffer when the one of the plurality of RADIUS servers receives the request message from the RADIUS client, increasing a queued message count value, and allowing the one of the plurality of RADIUS servers to transmit a first notification message including information relating to an unavailable state of the one of the plurality of RADIUS servers on the basis of a packet format in the RADIUS protocol when the queued message count value exceeds a maximum threshold value;
decreasing the queued message count value when the one of the plurality of RADIUS servers has processed a request message queued in the receiving buffer, and allowing the one of the plurality of RADIUS servers to transmit a second notification message including information relating to an available state of the one of the plurality of RADIUS servers on the basis of the packet format in the RADIUS protocol when the queued message count value is less than or equal to said maximum threshold value;
allowing the RADIUS client to check a state of the one of the plurality of RADIUS servers from each of the first and second notification messages received from the one of the plurality of RADIUS servers
updating information in a server information list maintained by the RADIUS client upon receipt of ones of the first and second notification messages from the one of the plurality of RADIUS servers when information contained in ones of the first and second notification messages differs from information contained in the server information list; and
selecting one of the plurality of RADIUS servers to send a request message for authentication, authorization and accounting services based on information on each of said plurality of RADIUS servers stored in the server information list.

11. The method claim 10, further comprising:
allowing the one of the plurality of RADIUS servers to transmit the notification message to the RADIUS client on the basis of the packet format in the RADIUS protocol after the one of the plurality of RADIUS servers checks its own state when the one of the plurality of RADIUS servers starts, the notification message including the information relating to the available or unavailable state of the one of the plurality of RADIUS servers.

12. The method of claim 10, further comprising:
allowing the one of the plurality of RADIUS servers to transmit the notification message to the RADIUS client on the basis of the packet format in the RADIUS protocol after the one of the plurality of RADIUS servers periodically checks its own state, the notification message including the information relating to the available or unavailable state of the one of the plurality of RADIUS servers.

13. The method of claim 10, further comprising:
sending a request message requesting authentication, authorization and accounting services to said selected one of said plurality of RADIUS servers.

14. The method of claim 11, further comprising:
the server information list comprising information of the available or unavailable state of each of the plurality of RADIUS servers.

15. The method of claim 13, further comprising:
allowing the RADIUS client to re-transmit the request message the predetermined number of times until the request message transmission is timed out after the RADIUS client transmits the request message;
allowing the RADIUS client to process a response message when the RADIUS client receives the response message from the one of the plurality of RADIUS servers before the request message transmission is timed out; and
allowing the RADIUS client to select another one of said plurality of RADIUS servers to transmit a request message to in RADIUS protocol based on server availability information in the server information list upon the request message transmission being timed out after the RADIUS client re-transmits the request message the predetermined number of times.

16. The method of claim 15, further comprising:
allowing the RADIUS client to notify a user of an error when all of said plurality of RADIUS servers in the server information list are unavailable.

17. A method, comprising:

providing a remote authentication dial-in user service (RADIUS) system that includes a RADIUS client and a plurality of RADIUS servers that communicates with the RADIUS client via RADIUS protocol;

receiving notification messages from ones of the plurality of RADIUS servers, the notification messages indicating whether or not a corresponding one of said plurality of RADIUS servers is in an available state;

updating a server information list maintained by the RADIUS client upon receipt of ones of said notification messages when information contained in the server information list differs from information contained in a received notification message;

selecting one of said plurality of RADIUS servers to send a request message to for authentication, authorization and accounting services based on information stored in the server information list; and sending a request message by said RADIUS client to said one of said plurality of RADIUS servers requesting authentication, authorization and accounting services, the availability of ones of the plurality of RADIUS servers being based on whether or not a queued message count at respective ones of said plurality of RADIUS servers exceeds a maximum threshold value.

18. The method of claim 17, further comprising:

the server information list and each notification message includes information relating to an availability and a level of threshold value of a corresponding one of said plurality of RADIUS servers.

19. The method of claim 17, further comprising:

the selecting of the one of the plurality of RADIUS servers being based on both availability information and level of threshold value information of each of the plurality of RADIUS servers stored in the server information list.

* * * * *